United States Patent [19]

Wagner et al.

[11] 4,342,211

[45] Aug. 3, 1982

[54] PROCESS AND APPARATUS FOR EXTRUDING A COMPOSITE SECTION

[75] Inventors: Alfred Wagner, Steisslingen; Adolf Ames, Hilzingen-Duchtlingen, both of Fed. Rep. of Germany

[73] Assignee: Swiss Aluminium Ltd., Chippis, Switzerland

[21] Appl. No.: 276,953

[22] Filed: Jun. 24, 1981

Related U.S. Application Data

[63] Continuation-in-part of Ser. No. 92,934, Nov. 9, 1979, Pat. No. 4,290,290, which is a continuation of Ser. No. 887,317, Mar. 16, 1978, abandoned.

[51] Int. Cl.³ .................... B21C 23/22; B21C 25/02; B21C 27/00
[52] U.S. Cl. .................... 72/253.1; 72/256; 72/272; 228/265; 425/113
[58] Field of Search .............. 72/253.1, 258, 259, 72/254, 255, 270, 272; 425/113, 114; 264/174; 228/117, 234, 265, 173 A, 173 B, 173 C, 265

[56] References Cited

U.S. PATENT DOCUMENTS

| 815,571 | 3/1906 | Williams | 425/114 |
|---|---|---|---|
| 1,197,326 | 9/1916 | Ackerman | 425/113 X |
| 1,812,686 | 6/1931 | Crowdes | 264/174 X |
| 2,696,640 | 12/1954 | Wienand | 425/114 X |
| 2,894,623 | 7/1959 | Walton | 72/272 |
| 2,974,791 | 3/1961 | Elkan | 72/272 |
| 3,956,056 | 5/1976 | Boguslawski et al. | 425/115 X |
| 4,021,172 | 5/1977 | Prinz | 425/325 X |
| 4,030,334 | 6/1977 | Wagner | 425/114 X |

FOREIGN PATENT DOCUMENTS

| 2208859 | 8/1973 | Fed. Rep. of Germany | 72/258 |
|---|---|---|---|
| 2031774 | 4/1980 | United Kingdom | 72/261 |
| 183170 | 6/1966 | U.S.S.R. | 72/253.1 |
| 422491 | 4/1974 | U.S.S.R. | 72/253.1 |
| 668735 | 6/1979 | U.S.S.R. | 72/267 |

*Primary Examiner*—Lowell A. Larson
*Attorney, Agent, or Firm*—Bachman and LaPointe

[57] ABSTRACT

A composite section comprises a beam-like section which may in particular be made of a light-weight metal, and a facing of at least a part of at least one face of the beam-like section made of another metal. The beam-like part is produced by extruding a billet of metal through a die, and at the same time the facing strip is fed through the shape-giving opening in the die. In order to provide an oxide free surface on the extruded beam-like part which is capable of bonding to the surface of the facing strip it is necessary, when using an unscalped billet, that the ratio of the maximum radius of the feed chamber of the die to the minimum radius of the container passage of the die be less than or equal to 0.8. Inside the die there is provided at least one moving face which may e.g. be in the form of a wheel, over which the facing strip passes in being fed to the die opening. Also the strip can be deformed during feeding or extrusion to provide a variety of shapes. The wheels can be shaped to effect the shaping of the strip. They also reduce friction and wear in the die. Measures are taken to allow easy access to such wheels for ease of repair or for changing the wheels.

22 Claims, 9 Drawing Figures

PROCESS AND APPARATUS FOR EXTRUDING A COMPOSITE SECTION

CROSS REFERENCE TO RELATED APPLICATIONS

This application is a continuation-in-part of Application Ser. No. 092,934, filed Nov. 9, 1979, now U.S. Pat. No. 4,290,290, issued Sept. 22, 1981 which is a continuation of Application Ser. No. 887,317, filed Mar. 16, 1978, now abandoned.

BACKGROUND OF THE INVENTION

The invention concerns a process for extruding a composite section comprising a beam-like section, in particular a beam-like section made of a light-weight metal, and a facing of at least a part of at least one of the surfaces of the beam-like section in the form of a strip of a different metal, in which process the beam-like section is formed by forcing an unscalped billet through a die and, at the same time, the metal strip passes through the shape giving section of the die. Furthermore, the invention concerns a die for carrying out this kind of extrusion wherein the ratio of the maximum radius of the feed chamber of the die to the minimum radius of the container passage of the die is less than or equal to 0.8.

Heretofore, in order to assure an oxide free surface on the extruded billet and correspondingly a good metal bond, it was necessary to scalp the billet to provide a fresh surface prior to extrusion. The foregoing resulted in decreased productivity and increased operating costs.

In addition, conventional processes use an extrusion die with feed channels at the side through which the metal facing strip is fed to the so called shape-giving or die opening and thereby defined into the direction of extrusion. In practice however the extrusion dies which have been known up to now for this purpose are usually troublesome in production due either to the strip sticking in the die or due to wear caused by the die.

Furthermore, the choice of section shape is often limited to those which are flat on at least a part of the surface.

SUMMARY OF THE INVENTION

With this in mind, the inventors set themselves the task of developing a process and extrusion die of the kind described above which eliminates the need for scalping the billet prior to the extrusion thereof and which allows for a wide range of shapes to be manufactured in a simple manner which can be readily carried out in production. Also, because of the shapes of section possible, the field of application of composite sections should be extended.

The first object is achieved by way of the present invention by providing an extrusion die which comprises a die insert having a shape-giving opening, a front plate having a feed chamber upstream of said shape-giving opening for feeding the billet to be extruded to said shape-giving opening and a container having a passage upstream of said feed chamber for feeding the billet to said feed chamber wherein the ratio of the maximum radius of said feed chamber of the die to the minimum radius of the container passage of the die is less than or equal to 0.8 such that the sticking friction between the outer surface of the billet to be extruded and the inner surface of the container passage prohibits oxide particles, etc. from entering the feed chamber of the die during extrusion of the billet.

By providing that r max./R min.$\leq 0.8$, where r max. equals the maximum ratio of the feed chamber of the die and R min. equals the minimum radius of the container passage, the billet deforms radially due to its impacting on the surface defining the opening to the feed chamber which results in an increase in pressure between the surface of the billet and the inner surface of the container passage. This results in the middle of the billet being accelerated into the feed chamber while the surface movement of the billet, i.e. that which may contain oxide particles, is retarded. The net effect is little or no oxide particles make their way to the shape-giving opening of the die.

The second object is fulfilled by way of the process of the present invention in that the facing strip is led on a moving surface to the die opening. In the process of the said facing strip coming in contact with the moving surface the strip should, if necessary, be deformed.

The facing strip is fed to the matrix by means of a negligibly small amount of friction in contact with the moving surface in the extrusion die, and thus deflected into the direction of extrusion.

In addition, the cross section of the strip is deformed while in contact with the moving surface—even during the extrusion process, at the die opening itself; the moving surface is designed with the desired shape of composite section in mind and, while being transported on the moving surface, the strip takes on the shape prescribed by the moving surface, at the latest when under the influence of the force of extrusion.

A plurality of strips can therefore be shaped simultaneously to cross sectional shapes which, if desired, may differ from one another, and then fed to the die opening which allows the production of composite sections which have at least three component layers, and this in a surprisingly simple manner.

The present invention also resides in an extrusion die for the production of composite sections as set forth above with reference to the r max./R min. ratio and further comprises a feed channel at the side for inserting the facing strip into the die such that, at the end of the feed channel close to the die opening, at least one surface on which the facing strip lies during extrusion moves towards the die opening. Also, there can be at least two such feed channels which lead to the die opening and which have moving surfaces in them to allow a plurality of facing strips to be fed into the die simultaneously, and where the moving surfaces are provided by wheels in the die; these wheels are fitted into the die in such a way that they can be changed in order to permit repairs to be done, or to allow other facing strip shapes to be produced.

During extrusion and on insertion of the facing strips, the matrix intercepts the outer, circumferential face of the wheel in such a manner that the facing strip and the face of the wheel are carried along together; as a result of the adjustment in relative movement between the strip and the matrix a metallic bond is promoted between both components of the section i.e. the structure of the two components becomes intimately engaged in each other.

To make it easier to fit or change wheels, the die can be divided into a die insert and a front plate, the channels for feeding-in the strips being formed out of grooves in the surface of the die insert and the surface of the front plate which the said grooves face; the recesses and thus the associated wheels are easily accessible when the front plate and die insert are separated.

It has been found in practice that the composite sections of the invention, because of the wide variety of shapes possible, are particularly suitable as elements for joining parts made of widely different materials; the facing strip, made of a heavy metal or a non-ferrous metal, can be joined thermally using a device suitable for this, and the light-weight metal beam section can be welded, for example to the superstructure of ships. The use of such extruded composite sections as connecting weld pieces simplifies, to a surprising degree, the assembly of constructions involving different metals. Therefore, extruded composite sections can now replace connecting pieces which have up to now always been made from composite sheets joined by explosive welding, and can do so at reduced costs.

BRIEF DESCRIPTION OF THE DRAWINGS

Exemplified embodiments of the invention will now be explained with the help of the following drawings wherein.

DETAILED DESCRIPTION

Figure 1:
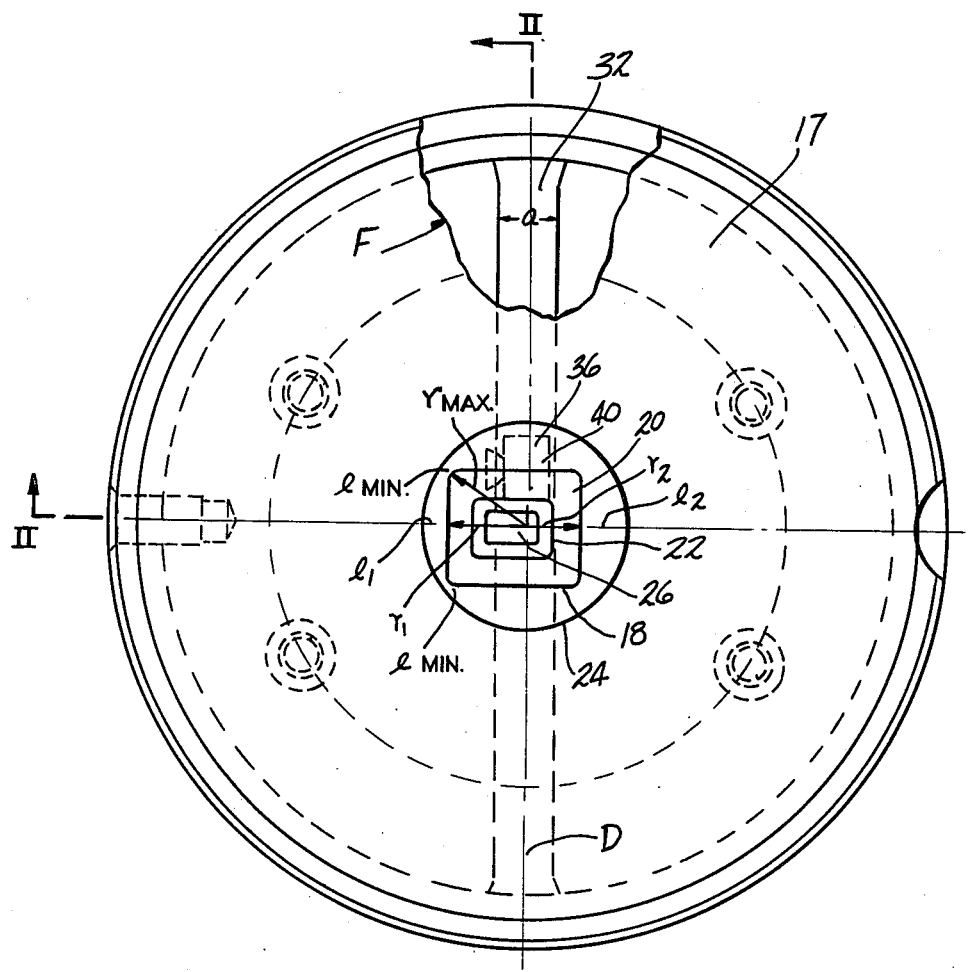
FIG. 1 is an end view of a die for the extrusion of composite sections.

A cylindrical die 10 for the extrusion of composite sections has a die insert 12 fitted in to the ring-shaped collar 14 of a front plate 16 and a container 17.

In the entry side of the front plate 16 is a feed chamber 18 which is shown as being rectangular in cross section, but may be circular or the like, and tapers in the direction of extrusion x along the axis M of the die to form a sloping bearing surface 20. A feed chamber 22, illustrated as rectangular, also connects up with this surface 20. Upstream of front plate 16 is container 17 having passage 24 in communication with feed chamber 18. For purposes of illustration passage 24 has been shown as being circular and having a radius R. However, it should be appreciated that passage 24 may be square, rectangular or the like, depending on the shape of the billet to be extruded, and in that case would have a radius ranging from R min. to R max. In the case of a circular passage R=R min. The face 21 of the front plate 16 next to the die insert 12 forms, inside the collar 14 of the front plate 16, a flat cone sloping in towards the die axis M and the feed chamber 22. A corresponding conical surface 23 of the die insert 12 lies against the face 21 of the front plate 16, and a shape-giving die opening 26 of height h, which is downstream of and narrower than feed chamber 22, is provided at the center. This opening 26 continues into a run-out channel 28 which is funnel shaped, opening out towards the face 30 of the die insert 12.

Two flat grooves 32 of breadth a (for example 20 mm) are provided along a common diameter D of the die (for example 300 mm) in the conical surface 23 of the die insert 12. This can be seen in particular in the cut-away region F in FIG. 1. These grooves 32 form, together with the face 21 of the front plate 16, the channels 34 for feeding the facing strips B to the die opening 26 during the extrusion process.

Figure 2:
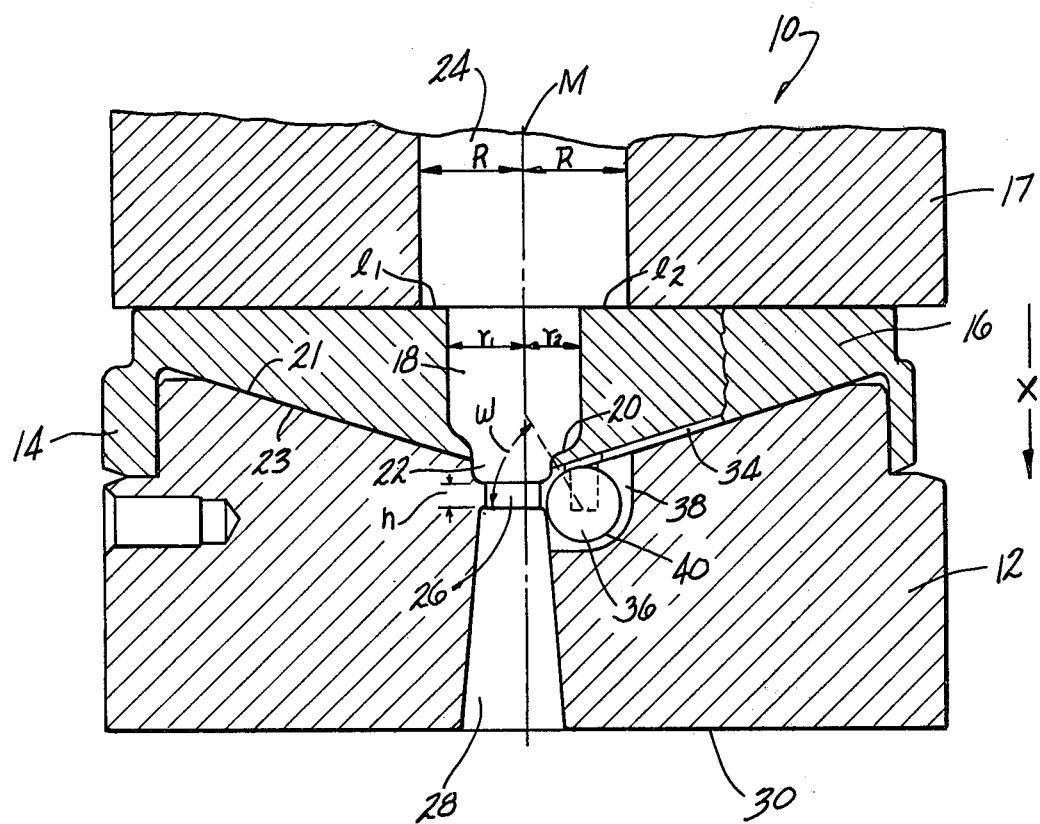
FIG. 2 is a section along line II—II in FIG. 1.

Wheels 36 are provided in the recesses 38 at the points of transition between the channels 34 and the die opening 26. The strips B lie on the circumference faces 40 of these wheels 36 while passing through the die 10 in the region of the angle w (FIG. 2).

In accordance with the present invention, passage 24 of container 17 is selected such that the radius R min. is slightly smaller than the minimum radius of the light-weight metal matrix A (billet) to be extruded. In order to assure an oxide free surface on the extruded beam-like part which is capable of bonding to the surface of the facing strip it is necessary, when using an unscalped billet, that the ratio of maximum radius r max. of the feed chamber 18 to the minimum radius R min. of the passage 24 be less than or equal to 0.8. When r max./R min. $\leq 0.8$ the billet being fed through passage 24 in container 17 to feed chamber 18 in front plate 16 impacts on the surface e min., $e_1$, $e_2$ causing the billet to upset, that is deform radially, thereby increasing the pressure exerted by the surface of the billet on the surface of passage 24 and correspondingly the sticking friction between the billet surface and the passage 24. The increased sticking friction retards the flow if the surface of the billet which contains oxide particles and at the same time accelerates the flow of the middle of the billet into the feed chamber 18. The result is that little or no oxide particles from the surface of the billet make their way to the shape-giving die opening 26 in die insert 12. Even if a small amount of oxide particles sporadically make their way into chamber 18 they would have no effect on the quality of the extrusion as the surface of the billet would have been dissipated. The narrowing 20 between feed chamber 18 and feed chamber 22 acts to further accelerate the middle of the billet and dissipate the oxide particles.

Figure 3:
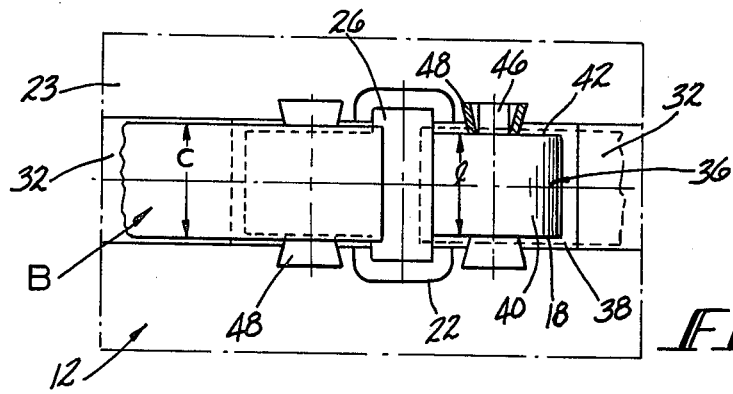
FIG. 3 is an end view showing an enlargement of part of the die in FIGS. 1 and 2.
Figure 4:
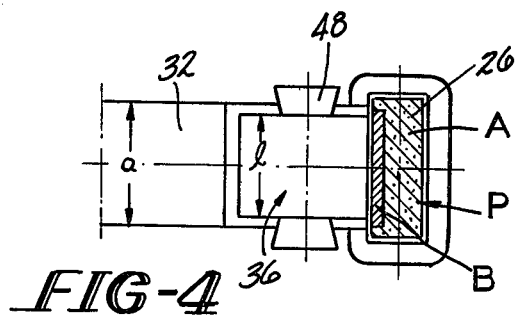
FIG. 4 is another version of the part shown in FIG. 3.

In the embodiment shown in FIG. 3 with two wheels 36 flanking the die opening 26, and in the version shown in FIG. 4 with only one wheel 36, the breadth c of the strip B is greater than the length l in the direction parallel to the axis of the wheel 36, so that the strip B projects over both faces 42 of the wheel 36 and, in the region of the die opening 26, covers the recess 38 for the wheel 36.

At the composite section P formed in the die opening 26 of the die shown in FIG. 4, a light-weight metal matrix A engages the strip B of unplated steel at the sides—in FIG. 3 the matrix A is omitted to allow other details to be seen more clearly.

Figure 5:
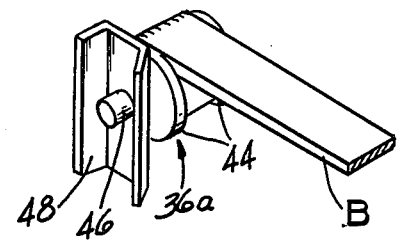
FIG. 5 is a perspective view of a detail of another version of the extrusion die.

The wheel 36 in FIG. 5 is provided with flanges 44 at the side to guide the strip B over the wheel 36; these flanges 44 can, in an embodiment of the die 10 not shown here, be broader than the strip B and can project into extensions at the side of the recesses 38—the length l of the wheels 36 is larger than the breadth a of the channels 13.

Pug-shaped bearings 46 project axially out from the flanges 44 and rotate in holes in bearing pieces 48 which are approximately U-shaped in cross section.

Figure 6:
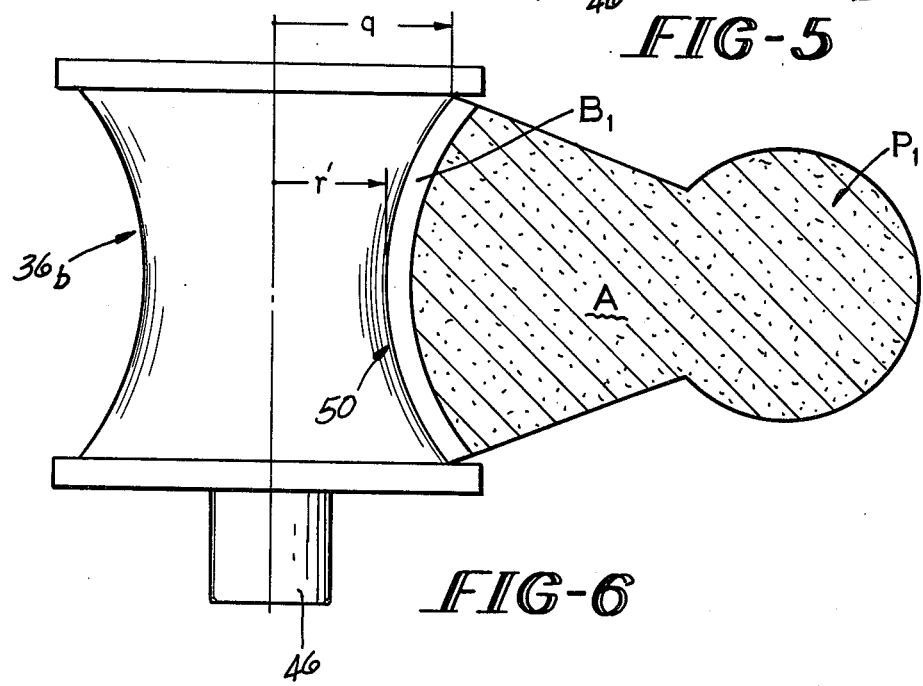
FIG. 6 is a component part in the form of a wheel in a modified form and enlarged compared with FIGS. 3 to 5.

Flat strips B can be bent across their section to form curved strips $B_1$, before entering the die opening, or in the die opening itself, by means of wheels 36 (FIG. 6) the outer running face of which forms a surface, for example a single shell hyperboloid which can be described by a second order equation. The result is e.g. a composite section $P_1$, with a convex outer face 50.

Figure 7:
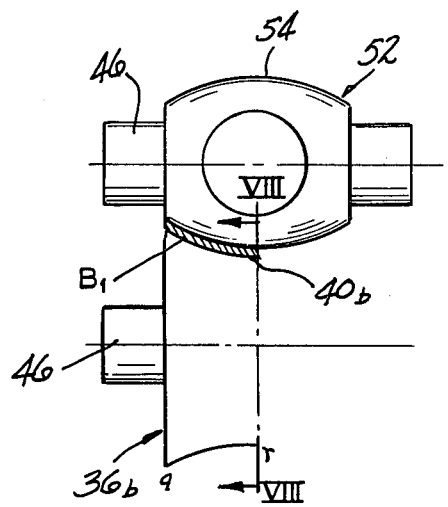
FIG. 7 is a view of part of the wheel shown in FIG. 6, and a partnering wheel.
Figure 8:
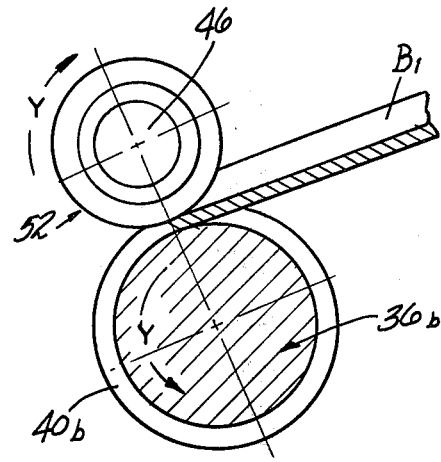
FIG. 8 is the side view to FIG. 7, partly sectioned along line VIII—VIII in FIG. 7.
Figure 9:
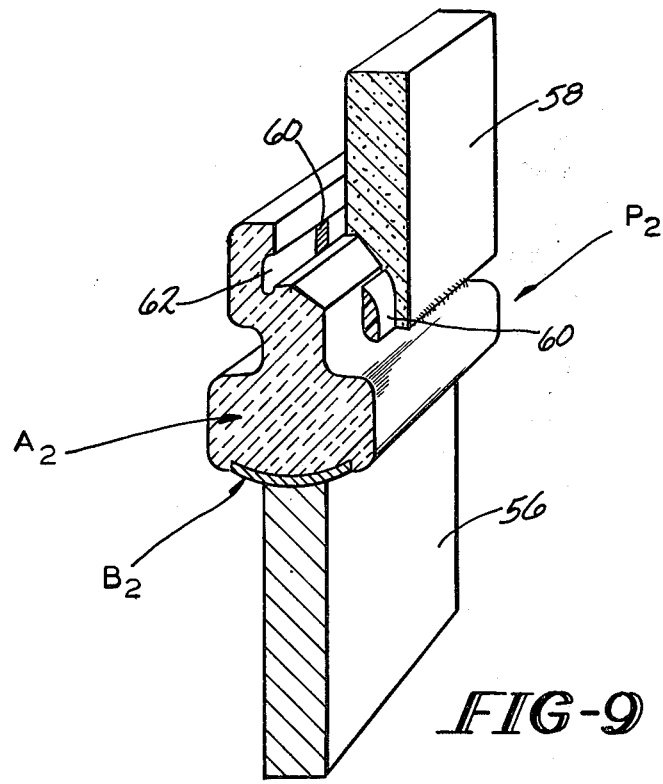
FIG. 9 is a perspective view of an extruded composite section.

In a further embodiment of the invention, wheel 36 is provided with a counter wheel 52, the outer face 54 of which matches the face 40 of wheel 36 i.e. in the case of the pair of wheels shown in FIGS. 7 and 8 this concerns the curved, approximately ellipsoidal cross section of the wheel 36 running from the two outer radii q to the smaller inner radius r'. The counter wheel 52 can then be situated in a recess (not shown here) such as recess 38 in FIG. 2. The flat strip B is passed through the feed channel 34 to a point about half way along this channel 34 where it is then shaped, in the manner illustrated, by the wheel 36 and its counter wheel 52 before being fed to the die opening 26 via the wheel 36.

Both wheels 36, 52 can be turned in the direction y, either by the strips B passing through or by means of a drive mechanism which is not shown in the drawing.

The extrusion die 10 is, for example, particularly suitable for the economic production of so-called weld connecting sections $P_2$ which have a curved face in the form of a steel facing strip $B_2$, to which a steel frame 56 with corresponding curvature is welded. The light metal component $A_2$ of the section $P_2$ is welded to a light metal part 58 after strips 60 of insulation are inserted in groove 62 in the light metal component $A_2$.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An extrusion die having a shape-giving opening, a feed chamber upstream of the shape-giving opening and communicating therewith, a feed channel at the side of the shape-giving opening and communicating therewith, and a container passage upstream of said feed chamber and communicating therewith, said die being for the extrusion of composite sections comprising a beam-like section, in particular a beam-like section made of a light-weight metal which can be fed to the shape-giving opening in the die through said container passage and said feed chamber, and a facing of at least a part of at least one face of the beamlike section in the form of a strip of another metal which can be fed to the shape-giving opening in the die through said feed channel, said feed chamber comprises a first section immediately downstream of said container passage and a second section downstream of said first section and immediately upstream of said shape-giving opening wherein the ratio of the maximum radius r max. of said first section of said feed chamber to the minimum radius R min. of said container passage is less than or equal to 0.8 and wherein said second section has a maximum radius r' max. less than the maximum radius r max. of said first section.

2. A die according to claim 1 wherein said container passage is circular in shape.

3. A die according to claim 1 wherein said feed chamber is circular in shape.

4. A die according to claim 1 wherein said container passage is rectangular in shape.

5. A die according to claim 1 wherein said feed chamber is rectangular in shape.

6. A die according to claim 1 wherein at least one moving surface is provided at the end of the feed channel adjacent the shape-giving opening on which the facing strip rests such that said facing strip does not contact the surface of the die.

7. A die according to claim 6 in which there are provided at least two feed channels which lead to the die opening and in which there are surfaces which move and are for the feed of facing strips.

8. A die according to claim 6 in which at least one form-giving wheel having a circumferential face is provided between the feed channel and the die opening, and said circumferential face of which forms the moving surface.

9. A die according to claim 8 in which said at least one wheel is fitted into the die in such a way that it can be changed.

10. A die according to claim 8 in which there is provided at least one power-driven wheel, the outer face of which conveys the facing strip.

11. A die according to claim 8 in which there is provided, at the end of the feed channel next to the die opening, a recess which accommodates said at least one wheel and which is at least partly open towards the channel and/or the die opening.

12. A die according to claim 11 in which one or more of said recesses are provided in the face of a die insert which is fitted to a front plate.

13. A die according to claim 12 in which one or more of said feed channels are made up of grooves in the face of the die insert and the front plate.

14. A die according to claim 8 in which the breadth of said wheel is smaller than the breadth of the facing strip.

15. A die according to claim 8 in which said wheel is provided with circumferential flanges at both sides between which flanges the facing strip is guided.

16. A die according to claim 8 in which said wheel is curved symmetrically with respect to its axis and in cross section.

17. A die according to claim 16 in which the outer circumferential face of said wheel can be described by a second order equation.

18. A die according to claim 16 in which the outer, circumferential face of said wheel is a shell-like hyperboloid.

19. A die according to claim 8 in which a counter formgiving wheel to said wheel is provided and the facing section is led through the gap between said wheels.

20. A die according to claim 19 in which the shapes of the outer faces of the pair of wheels match each other.

21. A die according to claim 8 in which said wheel has plug-shaped bearings which sit in rail-like bearing elements of the extrusion die.

22. A die according to claim 6 wherein the transition portion between the first section and the second section forms a projection, said projection being adjacent said at least one moving surface so as to project said at least one moving surface from the axial components of the extrusion force.

* * * * *